United States Patent

[11] 3,546,352

[72] Inventor Harry E. Bryan
 2817 Fondren, Dallas, Texas 75205
[21] Appl. No. 735,150
[22] Filed June 6, 1968
[45] Patented Dec. 8, 1970

[54] TRAINING DEVICE
 8 Claims, 4 Drawing Figs.
[52] U.S. Cl. .................................................. 35/10.2,
 35/12; 40/130; 240/2.1
[51] Int. C. .......................................................... G09b 9/02
[50] Field of Search .................................... 35/10.2, 10.4, 12

[56] References Cited
 UNITED STATES PATENTS

| | | | |
|---|---|---|---|
| 2,226,726 | 12/1940 | Kramar | 35/10.2 |
| 2,326,766 | 8/1943 | Delareuelle | 35/10.2 |
| 2,358,793 | 9/1944 | Crane | 35/10.2 |
| 2,387,875 | 10/1945 | Brann | 35/10.2 |
| 2,400,149 | 5/1946 | Immerman | 35/10.2 |
| 2,418,834 | 4/1947 | Hartman | 35/10.2 |
| 2,679,033 | 5/1954 | Hartman | 35/10.2UX |
| 2,858,622 | 11/1958 | Parvin et al. | 35/10.2 |

Primary Examiner—Malcolm A. Morrison
Assistant Examiner—Felix D. Gruber
Attorneys—Jack A. Kanz and Kenneth R. Glaser ABSTRACT: Disclosed is a training device for use in teaching the principles and proper use of instrument landing radio equipment. The training device includes a flat surface which simulates the radiation field adjacent a controlled runway and a hinged surface which represents the path of an aircraft when approaching the runway for landing. The device also includes a facsimile aircraft to be moved along the simulated flight path and electrical means for displaying positional information to the student pilot, and may include a set of instruction cards for presenting navigation problems, quizzes, and solutions for the student.

PATENTED DEC-8 1970

INVENTOR
HARRY E. BRYAN

ATTORNEY

INVENTOR
HARRY E. BRYAN

ATTORNEY

TRAINING DEVICE

This invention relates to visual teaching apparatus for teaching radio navigation. More particularly it relates to apparatus for use by the student pilot, navigation instructor, or any pilot for teaching and instruction in the use and understanding of radio navigation equipment, particularly instrument landing systems.

Major airports around the world utilize a standardized radio system for aiding the pilot in effecting a landing. The equipment comprises radio transmitters located at the end of the runway and at specified distances from the runway which transmit information to the pilot which allows him to effect a safe landing under adverse conditions. One transmitter located at the end of the runway transmits a VHF signal which identifies the location and position of the center line of the runway. A very directional beam approximately 5° wide is transmitted long the center of the runway. Thus an aircraft with a receiver properly tuned to this transmitter, known as the ILS localizer, may fly along the narrow beam and travel directly along a path which lies on the center of the runway. It will be noted, however, that the pilot may approach the runway from either end thereof and still be flying along the narrow beam of the ILS localizer.

To aid the pilot in following the proper rate of descent to the runway, a second radio beam is transmitted by a UHF transmitter at the end of the runway. This beam is transmitted along a useable line 30° wide (15° either side of the runway center line) and at 2.5° to 3.5° above the horizontal. Airborne radio receivers tuned to this signal are used by the pilot to maintain his aircraft in the path of the radio beam. By following the path of this beam the pilot can fly his aircraft along a constant glide path for descent to the runway touchdown point. This beam is known as the glide slope and is only transmitted in one direction. The direction of the glide slope beam is known as the front course or prime course approach. The approach path 180° from the front course is known as the back course. The back course has no glide slope beam.

Other transmitters are located at distances approximately one-half mile and 5 miles from the end of the runway on the front course. These transmitters are known as the middle marker and outer marker beacons, respectively. Each transmits a very directional signal straight up from the station. An aircraft passing through the marker beacon beam is thus immediately advised of its position relative to the runway.

Another transmitter, known as the ILS compass locater, is usually positioned at the outer marker beacon. The ILS locater is a low frequency nondirectional transmitter. In order to position his aircraft along the very narrow directional beam of the ILS localizer, the pilot may first fly to the position of the ILS locater. Once the position of the ILS locater is achieved, the aircraft may be oriented on the localizer beam and fly toward the runway along this narrow beam. The correct rate of descent is achieved by following the glide slope beam down to the runway.

The instrument landing system (known as the ILS) is an extremely accurate system which furnished the pilot very precise instrument references to control his landing. Extensive training and long hours of practice and instruction are required to fully acquaint the student with the proper use and understanding of the instrument landing system. Most of the difficulty, however, in understanding the information displayed in the cockpit stems from the student's inability to visualize the information displayed in the cockpit simultaneously with visualizing the aircraft's position and heading. Furthermore, since the localizer beam is of extremely narrow width and is transmitted along a path along the center line of the runway, and extending in either direction therefrom, novice pilots face a 180° ambiguity problem and often fail to realize that the aircraft may be on either side of the transmitter and still be flying along the narrow beam. Thus the aircraft may be positioned on the localizer beam but be proceeding toward or away from the runway, and may be on the front course of the ILS or on the back course ILS 180° from the front course. This difficulty often results in long hours with the instructor and student working with sketches, blackboards and written texts. Such instruction is quite time consuming for both the instructor and the student and often leaves many questions of the student unanswered. Furthermore, the instructor can only verify the student's retained knowledge and understanding of the equipment by actual tests under real conditions.

It is therefore an object of this invention to provide a visual training aid for use in the instruction of the proper use of the ILS equipment. A further object is to provide a device which instantaneously displays information on a facsimile cockpit instrument indicating the same information that would be displayed on a real cockpit instrument in an aircraft in the same relative position. A further object is to provide a device which faithfully duplicates each of the informational displays received by airborne radio equipment in aircraft approaching a runway on the ILS and to provide an inexpensive device which may be used by the student pilot without assistance from the instructor to acquaint himself with the use and operation of ILS equipment.

Briefly, the present invention is a navigation teaching aid which includes a large disc with its surface divided into three mutually isolated conductive sections. One of the conductive sections is a thin strip which passes substantially the full length of the disc through its center and represents the narrow ILS localizer beam transmitted by the ground station. The remainder of the disc is covered by two other conductive planes which represent the radiation field of the ILS localizer system. A wedge-shaped portion of the disc having the thin strip passing across its center is hinged near the center of the disc and raised at the circumference to simulate the glide path of an approaching aircraft on the front course. A facsimile aircraft is provided which has an informational display meter on its top side. As the aircraft is moved along the conductive surface, information is displayed on the informational meter which tells the student pilot the position of the aircraft with respect to the center line of the runway, glide slope, and distance from touchdown.

A unique advantage of the invention is the simultaneous visual display of the relative position of the aircraft with respect to the center line of the runway and the display on simulated cockpit instruments of information which would be displayed in the cockpit of a real aircraft in the same relative position with respect to a real runway. Furthermore, the training device positively maintains the 180° ambiguity problem, thus the student may clearly visualized his errors and the appropriate procedures necessary to correct the errors.

Other objects, features, and advantages will become more readily understood from the following detailed description taken in connection with the appended claims and attached drawings in which:

In accordance with the invention, a training device is provided which simulates the signals received in the cockpit of real aircraft on a meter on a facsimile aircraft when the facsimile aircraft is manuevered by the student in a simulated field. Since the facsimile aircraft is positioned in a simulated landing approach system, the student is presented with an immediate visual display of the aircraft with respect to the landing field, and the informational display which would be displayed in the cockpit of a real aircraft in the same relative position.

Figure 1:
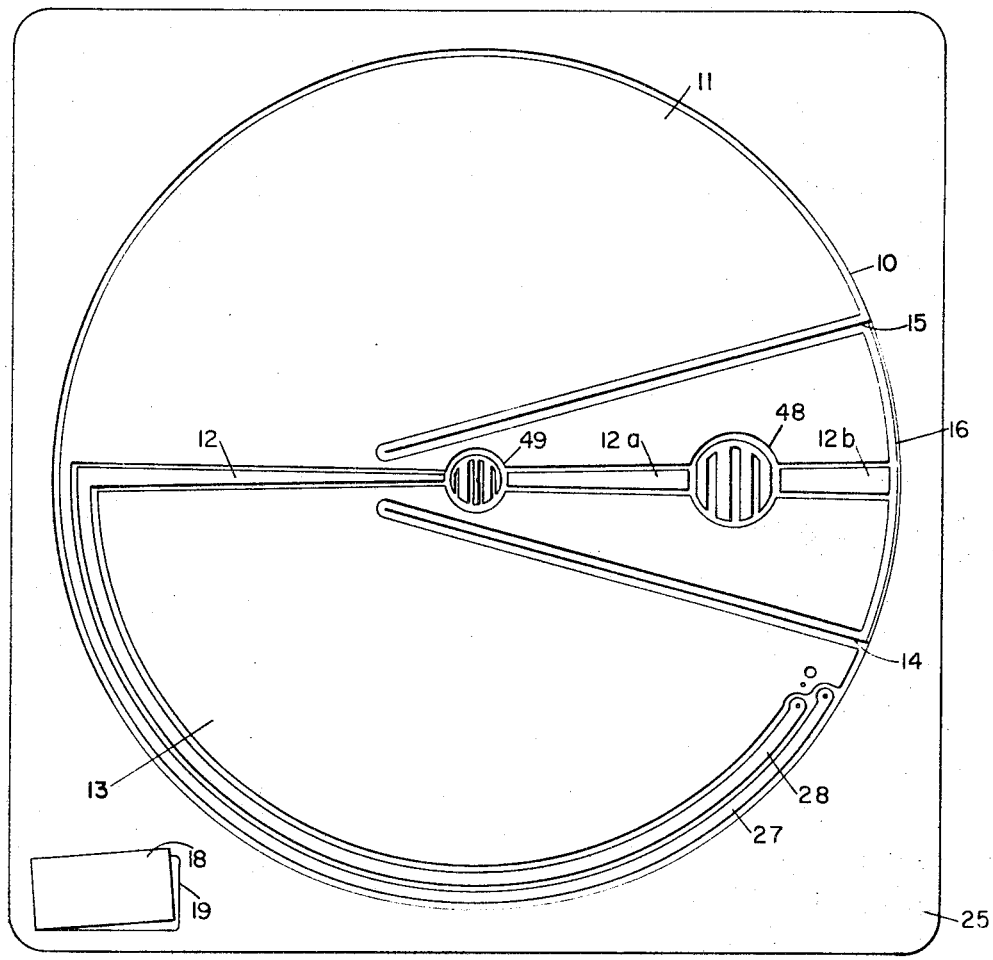
FIG. 1 is a top plan view of the simulated field of the device of the invention.
Figure 2:
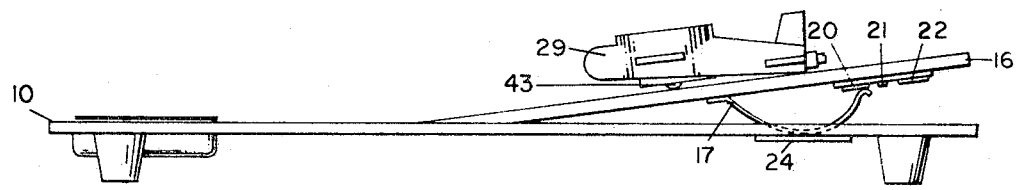
FIG. 2, is a side view of the device of FIG. 1.

Referring now to FIG. 1, there is shown a disc 10. The surface of the disc is covered with a conductive material such as copper. The conductive surface is cut into a distinct pattern by well known photoetching techniques to divide the surface into three distinct mutually isolated conductive portions 11, 12, and 13. The disc is cut along lines 14 and 15 to provide a wedge-shaped portion 16 thereof which is hinged near the center of the disc so that the outer edge thereof may be raised above the plane of the disc as shown in FIG. 2. The hinged tongue portion 16 is used to simulate the glide path of an airplane approaching an airstrip located at the point where the hinged tongue 16 adjoins the center of the disc 10. It will be noted that conductive strip 12 is continuous across the diameter of the disc and bisects the wedge-shaped portion 16. Likewise, conductive portions 11 and 13 are positioned opposite conductive portion 12, both on the flat plane of the disc and on the hinged tongue portion 16.

When properly oriented on the ILS approach, the pilot relies on the ILS localizer pointer to determine when he is on the correct course. The ILS localizer pointer is usually a pointer hinged at the top of a meter dial which swings right or left to indicate the direction the aircraft must fly to intercept the ILS approach path when the plane is in phase. Customarily the ILS localizer needle is the same pointer used as the right/left course deviation needle in the omni equipment. It must be recognized, however, that the ILS localizer only points toward the center of the ILS beam when the aircraft is heading toward the station on the front course ILS. The aircraft is then said to be 'phase.' If the aircraft approaches the landing strip 180° from from the front course ILS, the ILS localizer beam will be intercepted, but the aircraft will be 'out of phase' with the front course localizer beam. When the aircraft is out of phase with the ILS localizer, the localizer pointer will point away from the beam. Thus the pilot must fly away from the needle to intercept the back course ILS beam.

Likewise, the pilot relies on the glide slope needle on the instrument panel in the aircraft cockpit to tell him if he is on the proper glide slope. The glide slope needle is usually a pointer pivoted at one side of a meter face and so that the pointer may swing up and down from a horizontal position. The pilot can always "fly toward the needle" to establish himself on the appropriate glide slope, Thus if the needle goes up the pilot knows he must fly up to establish his aircraft on the proper glide slope. Likewise, if the needle goes down he knows he is above the proper glide path and must "fly down" into the proper path.

Figure 3:
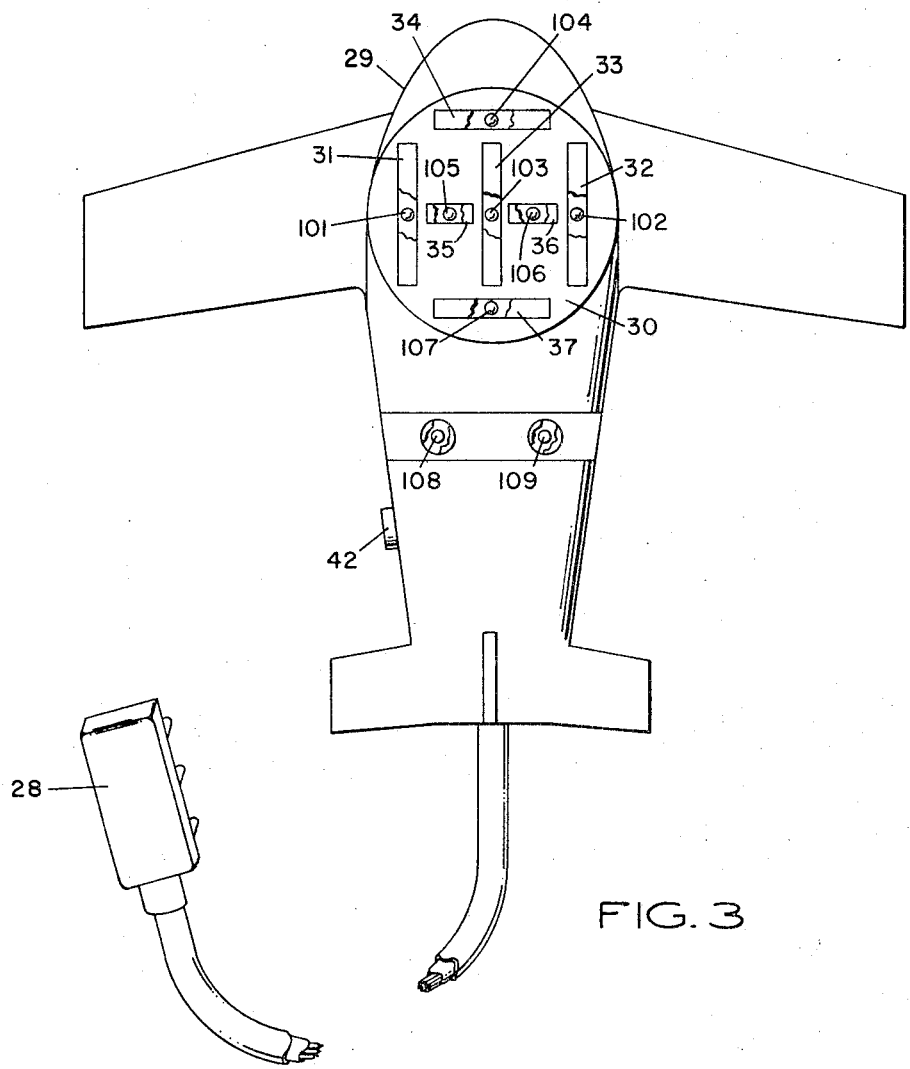
FIG. 3 is a top plan view of the facsimile aircraft of the invention including the simulated display meter.

The informational display of the ILS equipment is simulated in the training device of this invention by meter face 30 as shown in FIG. 3. In the preferred embodiment, the meter face 30 is attached on the top side of a facsimile aircraft 29. The meter face 30 may be formed of a thin translucent material which diffuses light passing therethrough. Three vertically disposed rectangular areas 31, 32 and 33 are delineated on the top surface of the meter face. Suitable baffles are placed below the meter face to coincide with the rectangular configuration delineated on the top surface thereof and light sources 101, 102, and 103 positioned therebelow. It will be readily recognized that when light source 101 is energized, light emanating therefrom will pass through the rectangular area 31, but due to the diffusion of the light passing therethrough, the entire rectangular area 31 will be substantially uniformly illuminated. Likewise, light from light source 102 will substantially uniformly illuminate rectangular area 32, and light source 103 will substantially uniformly illuminate rectangular area 33.

Rectangular areas 31, 32, and 33 are substantially vertically disposed to simulate the three primary positions of a pointer hinged at the top of the meter face. Thus illumination of rectangular area 33 simulates the position of a centered pointer. Illumination of rectangular area 31 simulates a left pointer position, and illumination of rectangular area 32 simulates a right pointer position. Likewise, rectangular areas 34, 35, 36 and 37, all positioned substantially horizontally on meter face 30, simulate the primary positions of a pointer hinged at either side of the meter face. Illumination of rectangle 34 indicates an up position of the pointer. Illumination of rectangles 35 and 36 indicates a centered position of the pointer, and illumination of rectangle 37 indicates a down position of the pointer.

Figure 4:
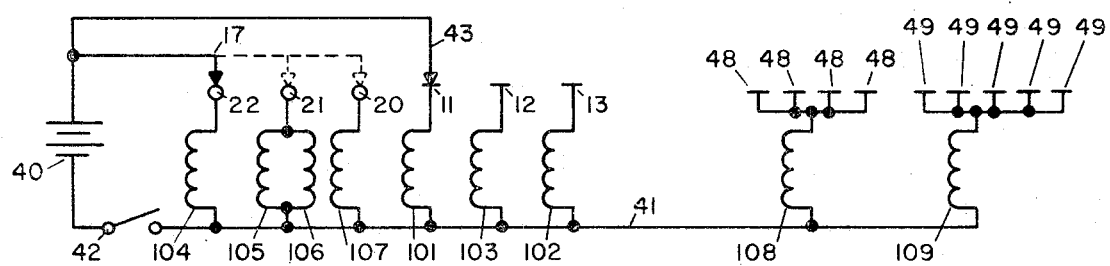
FIG. 4 is a schematic illustration of the electrical circuitry of the preferred embodiment of the training device of this invention.

The circuitry of the preferred embodiment is schematically illustrated in FIG. 4. The circuit basically comprises a voltage source 40 connected in parallel with a plurality of light sources 101—109. One side of the voltage source 40 is connected to a common lead 41 through switch 42. Each of light sources 101—109 are connected to common lead 41. The opposite side of voltage source 40 is connected to a contact point 43 which extends from the underside of the facsimile aircraft 29. As schematically represented in FIG. 4, contact point 43 may contact any of the conductive planes 11, 12, and 13. Thus by placing the model plane 29 on conductive surface 11, as shown in FIG. 1, contact point 43, extending from the bottom of the plane, contacts the conductive surface 11, completing the circuit between voltage source 40 and light source 101 and causing light source 101 to illuminate rectangular area 31. Note that the airplane placed anywhere on conductive surface 11 is to the right of the front course ILS approach. Thus rectangular window 31 is illuminated, simulating a pointer position to the left, indicating to the pilot to fly left. Likewise, when facsimile airplane 29 is placed anywhere on conductive portion 13, contact point 43 will contact conductive portion 13 and complete a circuit including light source 102. Thus light source 102 will illuminate rectangular area 32 indicating a pointer position to the right on the facsimile meter 30, which tells the pilot to fly right. When the airplane is centered over conductive path 12, which simulates the narrow beam of the ILS course, contact point 43 will contact conductive portion 12 causing illumination of light source 103. As noted in FIG. 3, illumination of light source 103 gives a centered pointer position indicating to the pilot that the aircraft is on the ILS course.

Referring now to FIG. 1 and 2, it will be seen that when the disc of FIG. 1 represents the area adjacent an airport, the hinged tongue portion 16 may be used to indicate the glide slope approach path of an aircraft landing at the point where tongue 16 is hinged to the disc. Directly below hinged portion 16 is a spring contact 17 which has one end fixed to the tongue and the other end resting on an electrical contact 20. The arch of the spring rests on a spring support 24. When the spring is in its relaxed position, as shown in FIG. 2, the slideable end thereof is resting on contact 20. It will be observed as tongue portion 16 is depressed, spring 17 is tensed until the sliding end thereof comes in contact with electrical contacts 21 or 11 22.

It will be readily appreciated by those skilled in the art that other multiple position switch arrangements a may be substituted for that shown in FIG. 2. For instance, the spring and switch contacts need not be unitary as shown. It is important, however, that the tongue 16 have some means for urging it upward when the external downward pressure is supplied, and that the switch interconnects appropriate circuitry to indicate the position of the tongue 16.

By referring to the schematic diagram of FIG. 4, it will be observed that light sources 104—107 (which are positioned below the horizontal rectangles in meter 30) are individually illuminated by the position of spring contact 17. Thus, in the position shown in FIG. 2, spring contact 17 is resting on electrical contact 20 completing a circuit including light source 107 when switch 42 is closed.

Referring to FIG. 3, it will be noted that light source 107 is located beneath horizontal rectangle 37, indicating a pointer in the down position. The information displayed to the pilot is that the plane must fly down to intercept the proper glide slope. As pressure is applied to the hinged tongue 16, sliding spring contact 17 comes in contact with electrical contact 21. By referring to FIG. 4 it will be noted that when electrical contact is formed between contact 21 and spring 17, lights 105 and 106 are illuminated, simulating a centered pointer position. The information relayed to the pilot is that the plane is on the proper glide slope. Likewise, when excessive pressure is applied to tongue 16, spring 17 contacts electrical contact 22 causing illumination of light source 104. Illumination of light source 104 causes illumination of rectangle 34 which simulates a pointer in the up position on the dial face indicating to the pilot he must fly up to intercept the proper glide slope.

From the foregoing, it will be observed that the student pilot may place the facsimile aircraft 29 anywhere on the simulated field and the indications received on meter 30 will faithfully duplicate the informational display received in the cockpit of a real aircraft when placed in the o position simulated by the facsimile aircraft in the simulated field. Furthermore, the student may reposition the aircraft and observe the changed informational display which tells him the relative position of his aircraft at all times.

Referring again to FIG. 1, it will be noted that the conductive plane 12, which simulates the narrow beam of the ILS localizer, is interrupted in two spots by isolated contact points 48 and 49. It will be noted that contact point 48 comprises four fingers of substantially uniform width extending across the path of conductive plane 12. Referring now to FIG. 4, it will be noted that as contact point 43, extending from the bottom side of facsimile aircraft 29, is moved across contact fingers 48 at a uniform rate of speed, the contact pointer 43 will alternately engage and disengage each of the fingers 48 causing light source 108 to emit code signals in the form of 'dash dash dash.'

Light source 108 is mounted in the facsimile aircraft 29 and illuminates a window of purple color. Contact point 48 represents the outer marker beacon which is normally about five miles from the touchdown point on the runway. The outer marker beacon is designed to tell the pilot his horizontal distance from touchdown point and emits a code signal to notify the pilot of his position. Thus the trainer simulates the signal received by the pilot in the real aircraft when crossing the outer marker beacon. Likewise the middle marker beacon is simulated by contact point 49 which comprises five fingers extending across the path of conductive plane 12. The five fingers are of consecutively narrow and wide width so that the contact point 43 passing thereover is intermittently engaged with first a narrow finger and then a broad finger, resulting in illumination of light source 109 in a 'dash dot dash dot' code pattern. The code pattern indicates to the student pilot that he is crossing the middle marker beacon which is normally about one-half of a mile from touchdown point on the landing strip. Light source 109 illuminates an amber window mounted on the aircraft 29, which duplicates the amber flashing signal received in the cockpit of a real aircraft crossing the middle marker beacon as it approaches a long strip. It will be understood that if desired, additional marker beacon light sources may be included in the circuitry and display to indicate the Z marker.

In the preferred embodiment disc 11 is formed of copper covered ABS plastic cut in the form of a disc approximately 18 to 24 inches in diameter. The disc is then etched to form the desired conductive patterns and positioned in a suitable housing having a top surface 25. It will be readily understood that the field simulated by disc 11 need not be circular, but may be any suitably convenient form.

In order to make electrical interconnection between each of the conductive areas and the illumination circuitry, suitable conductive line 27, 28 may be patterned on the disc to provide a receptacle point for plug 28.

Since contact fingers 48 and 49 are each isolated from other conductive portions on the surface of the hinged tongue 16, suitable electrical contact thereto may be made by passing conductive pins (not shown) through each of contact points 48 and 49 as well as the supporting tongue and attaching leads to the underside of the pins below the tongue. Likewise, since conductive strip 12 is broken by the marker beacon contacts 48 and 49, suitable means must be provided to maintain electrical continuity between strip 12 and the severed portions 12a and 12b. Electrical continuity may be provided between strip 12, 12a and 12b by passing vertical conducting pins through the strips and the supporting tongue and interconnecting the pins on the underside of the tongue by conventional techniques well known in the circuit board art.

To further aid the student in understanding the proper use of the instrument landing system, a set of printed instruction cards 18 may be provided. The cards 18 may be conveniently housed in depression 19 in top surface 25.

The instruction cards may contain printed or diagrammatic information on one surface thereof posing a problem to be solved by the student. The student may then manipulate the facsimile aircraft to conform with the printed instructions or duplicate a situation prescribed by the instruction card. By pressing switch 42 on airplane 29, a circuit will be completed to display on meter 30 the information which would be received in a real aircraft situated in the same relative position.

Solutions to the problems posed may be printed on the back side of the card so that the student may immediately check his solution against the correct solution. In such a manner the student may practice at his leisure until he is fully proficient in understanding of the ILS.

It will further be understood that the student may vary the simulated glide path of the facsimile aircraft while moving the aircraft 29 along the surface of tongue 16. In so doing, he may observe the meter indications change with changing glide path. As the contact 43 crosses the marker beacons 48 and 49, beacon indicator lamps on the airplane duplicate the marker beacon indications in a real aircraft to indicate distance from touchdown. By applying varying pressures on the aircraft 29, the student may alter the glide slope. As the glide slope is altered, the information displayed on meter 30 will indicate the correction necessary to place the aircraft on the proper path.

From the foregoing it will be observed that the training device of this invention simulates and faithfully duplicates the meter indications in the cockpit of an aircraft approaching a landing strip using the instrument landing system. The device may be constructed quite inexpensively and, if desired, may be mounted in a suitable carrying case with a handle and hinged cover (not shown).

While the invention has been described with particular reference to DC circuit, it will be readily understood that other means for suitably providing the informational display may be used. For example, an AC circuit incorporating a suitable stepdown transformer is satisfactory. Likewise, the information display and beacon lights need not be mounted on the facsimile aircraft, but may be mounted elsewhere on the training device.

It is to be understood that although the invention has been described with particular reference to specific embodiments thereof, the form of the invention as shown and described is to be taken as a preferred embodiment of same, and that various changes and modifications may be resorted to without departing from the spirit and scope of the invention as defined by the appended claims.

I claim:

1. An apparatus comprising:
   a. a substantially flat nonconductive surface having a first relatively narrow strip of conductive material traversing said surface;
   b. first and second conductive areas disposed on said surface, each mutually isolated from the other and on opposite sides of said narrow strip;
   c. a hinged surface adjoining said substantially flat surface, said hinged surface having a relatively narrow strip of conductive material traversing same forming an extension of said first relatively narrow strip of conductive material, said hinged surface having mutually isolated conductive areas disposed thereon on opposite sides of said narrow strip and forming extensions of said first and second conductive areas disposed on said substantially flat surface;
   d. a moveable facsimile aircraft adapted for movement along the surface of said flat surface and said hinged surface; and
   e. display means responsive to the position of said facsimile aircraft on said flat surface and said hinged surface;

2. The apparatus defined in claim 1 wherein said display means comprises:
   a. a meter face;
   b. a plurality of light sources positioned beneath said meter face and adapted to illuminate selected portions of said meter face; and c. circuit means selectively interconnecting said light sources with a voltage source, said conductive areas, and a contact point on said facsimile aircraft, whereby a circuit is completed by placing said facsimile aircraft on any one of said conductive areas.

3. The apparatus of claim 1 wherein said hinged surface is hinged near the center of said substantially flat surface and is displaced upward from the plane of said substantially flat surface.

4. The apparatus of claim 1 wherein said hinged surface supports a plurality of simulated marker beacon fields, each of said simulated marker beacon fields comprising an electrically conductive region isolated from other conductive regions on said hinged surface and electrically interconnected with light sources on said moveable facsimile aircraft.

5. The apparatus of claim 4 wherein said simulated marker beacon field comprises a series of conductive strips adapted to alternately engage and disengage an electrical contact drawn thereacross, thereby energizing a circuit in a code pattern indicative of each marker beacon field.

6. A device comprising:
   a. simulated ILS localizer radio field disposed substantially in one plane, said simulated ILS localizer radio field having a substantially flat surface with conductive material disposed thereon; and
   b. a simulated glide path beam adapted to be moved from the plane of said simulated ILS localizer radio field to a plurality of plane positions which intersect the plane of said simulated ILS localizer radio field, said simulated glide path beam having a substantially flat surface with conductive material disposed thereon.

7. In combination with the device of claim 6:
   a. a moveable facsimile aircraft adapted to be positioned on the surface of said device; and
   b. display means responsive to the position of said facsimile aircraft on the surface of said device.

8. The device set forth in claim 7 wherein said display means comprises:
   a. a meter face divided into areas;
   b. a plurality of light sources positioned adjacent said meter face and adapted to illuminate selected areas of said meter face; and
   c. circuit means selectively interconnecting said light sources with a voltage source and conductive areas positioned on the surface of said device.

UNITED STATES PATENT OFFICE
CERTIFICATE OF CORRECTION

Patent No. 3,546,352                                         December 8,

Harry E. Bryan

It is certified that error appears in the above identified
patent and that said Letters Patent are hereby corrected as
shown below:

Column 1, line 17, "long" should read -- along --. Column
line 24, before "phase" insert -- in --; line 25, cancel "fro1
first occurrence. Column 4, line 43, cancel "11"; line 46, ca1
"a". Column 5, line 5, cancel "o"; line 21, after "dash", sec(
occurrence, insert -- dash --; line 36, "a 'dash dot dash dot'
should read -- a 'dot dash dot dash dot' --; line 43, "long"
should read -- landing --. Column 6, line 69, the semi-colon
should read a period.

Signed and sealed this 13th day of April 1971.

(SEAL)
Attest:

EDWARD M. FLETCHER, JR.                        WILLIAM E. SCHUYLEF
Attesting Officer                              Commissioner of Pat